United States Patent
Truong et al.

(10) Patent No.: US 12,105,593 B2
(45) Date of Patent: Oct. 1, 2024

(54) USB PORT REBOOT CONTROLS

(71) Applicant: HEWLETT-PACKARD DEVELOPMENT COMPANY, L.P., Spring, TX (US)

(72) Inventors: Binh T. Truong, Spring, TX (US); Aaron Sanders, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 50 days.

(21) Appl. No.: 17/965,711

(22) Filed: Oct. 13, 2022

(65) Prior Publication Data

US 2024/0126650 A1    Apr. 18, 2024

(51) Int. Cl.
   *G06F 11/14*   (2006.01)
   *G06F 11/22*   (2006.01)

(52) U.S. Cl.
   CPC ...... *G06F 11/1417* (2013.01); *G06F 11/2221* (2013.01); *G06F 11/2284* (2013.01)

(58) Field of Classification Search
   CPC ............. G06F 11/1417; G06F 11/2221; G06F 11/2284
   See application file for complete search history.

(56) References Cited

U.S. PATENT DOCUMENTS

2020/0092118 A1*  3/2020  Zhuang ................... H04L 12/10
2020/0097379 A1*  3/2020  Truong ............... G06F 13/4063

FOREIGN PATENT DOCUMENTS

WO    WO-2020018094 A1 *  1/2020

\* cited by examiner

*Primary Examiner* — Zahid Choudhury
(74) *Attorney, Agent, or Firm* — Knobbe, Martens, Olson & Bear, LLP (57) ABSTRACT

The example computing device includes a universal serial bus (USB) port to provide a data connection and power to a connected device. The example computing device also includes a controller to control a power state of the USB port during a reboot process of the computing device. The example computing device further includes a basic input/output system (BIOS) to send a port reboot setting to the controller. The port reboot setting defines a power-off time period that the USB port is to be powered off during the reboot process.

15 Claims, 5 Drawing Sheets

USB PORT REBOOT CONTROLS

BACKGROUND

Electronic technology has advanced to become virtually ubiquitous in society and has been used to enhance many activities in society. For example, computing devices are used to perform a variety of tasks, including work activities, communication, research, and entertainment. Different varieties of electronic circuits may be utilized to provide different varieties of electronic technology. In some examples, computing devices include ports to connect to other devices.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The present disclosure is drawn to the control of the reboot behavior for universal serial bus (USB) ports. For example, a USB port may provide a data and power connection to a connected device. Individual USB ports may be adjusted to set a power-off time period that the USB port is powered off during the reboot process. By powering off a USB port, the connected device may also be rebooted for the power-off time period. In some examples, the power-off time period for a given USB port may be set based on conditions of the connected device. For example, a first connected device may operate effectively with a short power-off time period while a second connected device may operate effectively with a longer power-off time period.

In some examples, a USB port provides power to a connected device. For example, a standard USB port may provide 5 volts (V) of power to a connected device. In some examples, a powered USB (PUSB) port may include a power rail to provide additional power (e.g., 12V, 24V, etc.) to a connected device. In an example, various industries (e.g., retail, commercial, industrial, etc.) use 12V and 24V powered USB devices. These connected devices may take longer to discharge voltage when power is removed during a reboot of the host computing device. This delay in discharging voltage may cause issues when the connected device is not fully powered off, but then powers back on. For example, without fully powering off a connected device, memory of the connected device may not fully be cleared, which may lead to software or firmware errors.

In an example scenario, a connected device may be a printer powered by a PUSB port with a 24V power rail. During a reboot of the computing device, the voltage of the printer should drain to 0V. However, when the 24V power rail on the printer does not fully drain/cycle to 0V, the printer may enter a bad state on bootup.

In another example scenario, the connected device may be a USB powered ethernet hub attached to a computing device. When the computing device performs performed a reboot, the 5V rail of the USB port may reset during a power on self-test (POST) for half a second. This event causes the USB-powered ethernet hub to lose power and causes other devices (e.g., a pin pad) that use the ethernet hub to access a network to lose functionality.

The present specification describes examples for controlling the behavior of USB ports during a reboot process. Each USB port may be set to stay powered off for a predefined period. It could be a short period for 5V devices, and a longer period for higher voltage devices. In some examples, there may be an always-on mode for devices that should not be powered off during a reboot. For example, the USB port for a payment terminal that takes a long to boot up and initialize may be set to remain on during a reboot of the computing device.

In some examples, the USB port reboot behavior may be user-adjustable. For example, a first USB port may be set for 1 second, a second USB port may be set for 2 seconds, a third USB port may be set for 30 seconds, and a fourth USB port may be set to 0 meaning always powered-on during reboot. In this case, the third USB port may be a 24V PUSB port attached to a printer that takes a long time to fully discharge. During a reboot, the rest of the computing device (including the other USB ports) may boot quickly and start back up. However, the third USB port would wait 30 seconds before powering on. This power-off time period may give the printer adequate time to discharge from 24V and do a safe power cycle.

In some examples, the computing device may include a basic input/output system (BIOS) to set the reboot behavior of the USB ports. The BIOS may send the port reboot setting to a controller (e.g., a power delivery controller) of the USB ports to implement the port reboot setting. In some examples, a boot menu or other user interface may be used to set the power-off time period for each USB port of a USB hub. This configuration file may be saved on one computing device machine and replicated to other computing devices to ensure consistent behavior. In some examples, the reboot of the computing device may include a warm reboot where the computing device restarts without completely powering off.

In addition to adjusting the power-off time period for USB ports during reboot, the present specification also provides examples of scheduling an individual USB port to reboot at a specified time and/or for a specified. In an example, the scheduled reboot of a USB port may be used in the case of a payment terminal that takes a long time to reboot. The reboot of the USB port connecting the payment terminal may be skipped during, so it is skipped during standard reboots of the computing device. However, a scheduled daily reboot of the payment terminal may be performed to cleaning out memory, to meet government rules about rebooting payment devices, and/or based on a user preference.

The present specification further provides the ability to control the reboot behavior of USB ports based on the identification of the connected device. A table of devices may include device identifiers (e.g., vendor ID (VID) and product ID (PID) for different devices that may be connected to the USB ports of the computing device. When a device is connected to a USB port, the BIOS may check the device identifier. The BIOS may then set the reboot behavior of the USB port connected to the identified device. This approach may be useful in the case where the computing device includes multiple USB ports, and a particular device is having an issue during reboot.

The present specification describes examples of a computing device. The example computing device includes a USB port to provide a data connection and power to a connected device. The example computing device also includes a controller to control a power state of the USB port during a reboot process of the computing device. The example computing device further includes a BIOS to send a port reboot setting to the controller. The port reboot setting defines a power-off time period that the USB port is to be powered off during the reboot process.

In another example, the present specification describes another example computing device that includes a USB port to provide a data connection and power to a connected device. The example computing device also includes a controller to control a power state of the USB port during a reboot process of the computing device. The computing device further includes a BIOS to send a port reboot schedule to the controller. The port reboot schedule defines a power-off time period and a scheduled time that the USB port is to be powered off while the computing device remains operational.

In yet another example, the present specification describes another example computing device that includes a USB port to provide a data connection and power to a connected device. The example computing device also includes a controller to control a power state of the USB port during a reboot process of the computing device. The computing device further includes a memory to store a table of devices. The example computing device also includes a BIOS to 1) identify the connected device based on a device identifier received from the connected device and the table of devices; 2) determine a power-off time period that the USB port is to be powered off during a reboot process based on the identified connected device connected to the USB port; and 3) send a port reboot setting to the controller identifying the power-off time period that the USB port is to be powered off during the reboot process.

As used in the present specification and in the appended claims, the term "controller" may be a processor resource, a processor, an application-specific integrated circuit (ASIC), a semiconductor-based microprocessor, a central processing unit (CPU), and a field-programmable gate array (FPGA), and/or other hardware device that executes instructions.

As used in the present specification and in the appended claims, the term "memory" may include a non-transitory computer-readable storage medium, where the computer-readable storage medium may contain, or store computer-usable program code for use by or in connection with an instruction execution system, apparatus, or device. The memory may take many types of memory including volatile memory (e.g., RAM) and non-volatile memory (e.g., ROM).

As used herein, a basic input/output system (BIOS) refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

Figure 1:
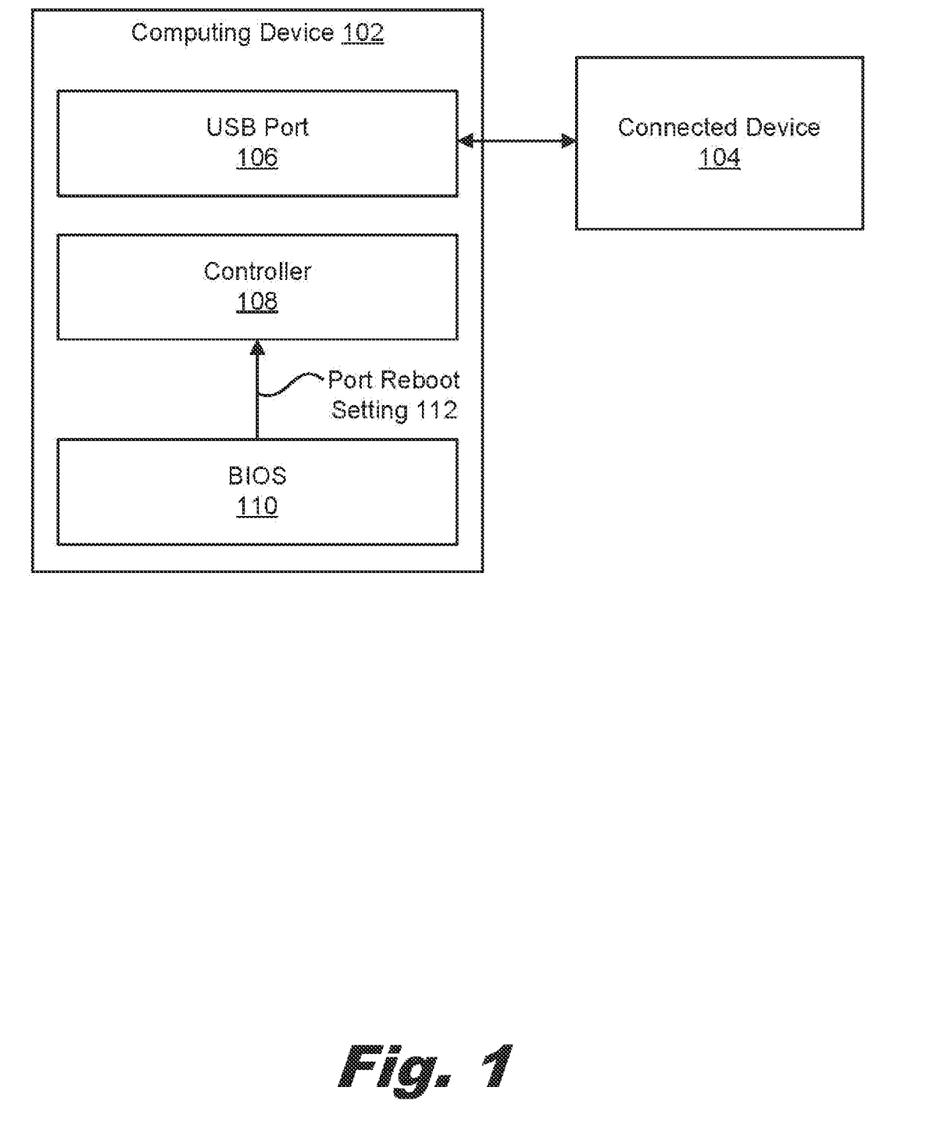
FIG. 1 is a block diagram of computing device to control port reboot behavior, according to an example.

Turning now to the figures, FIG. 1 is a block diagram of computing device 102 to control USB port reboot behavior, according to an example. It is to be understood that the computing device 102 may include additional components and that some of the components described herein may be removed and/or modified. Furthermore, components of the computing device 102 depicted in FIG. 1 may not be drawn to scale and thus, the computing device 102 may have a different size and/or configuration other than as shown therein. In some examples, some components of the computing device 102 may be implemented separate from the computing device 102. For example, the USB port 106 may be an external device. For ease of explanation, the examples of the present specification describe a USB port 106 that is integrated with the computing device 102. Examples of the computing device 102 include a laptop computer (e.g., also referred to as a notebook computer), a desktop computer, a tablet computer, an all-in-one computer, a gaming console, or other computing device that includes a USB port 106 to provide a data connection and power to a connected device 104.

The connected device 104 may be a device that connects to the USB port 106 of the computing device 102. The connected device 104 may be powered by the USB port 106. For example, the connected device 104 may receive voltage and current from the USB port 106 to power the connected device 104. In some examples, the connected device 104 may be powered entirely by the USB port 106. Examples of the connected device 104 include printers, scanners, user interface devices (e.g., game controllers, keyboards, mice, key pads, etc.), ethernet hubs, and point-of-sale equipment (e.g., payment terminals, cash registers, barcode readers, etc.). As described above, the connected device 104 may be physically separate from the computing device 102 aside from a wire connection providing data and power from the USB port 106. In some examples, the connected device 104 may be incorporated within the computing device 102 and is connected with a wire to an internal USB port 106.

In the present specification and in the appended claims, the term "USB port" refers to an interface that, with a cable or connector for communication between electronic devices, supplies data and electrical power to a connected device 104. In one example, the USB port may operate according to USB standards maintained by the USB Implementers Forum (USB-IF). As will be described below, the electrical power from the USB port 106 may be the sole electrical power provided to the connected device 104. The USB port 106 may be a USB 1.x, a USB 2.0, a USB 3.x, and USB4 standard. Additionally, the USB port 106 may use any type of connector interfaces to electrically couple the connected device 104, including micro-B plug, UC-E6 plug, mini-B plug, standard-A receptacle, standard-A plug, standard-B plug, USB Type-C connector, among others.

In some examples, the USB port 106 may be powered USB (PUSB) port. As used herein, a "powered USB port" refers to a USB port that also provides voltage to a connected device 104 beyond the 5V provided by a standard USB port. In some examples, a PUSB port may provide 12V, 24V, or other voltage. As used herein, the USB port 106 may be implemented as a standard USB port or a PUSB port. In some examples, a PUSB port may include a first connector to receive a standard USB plug and a second connector to receive a power plug. In some examples, the PUSB port may include a power rail to provide power (e.g., 12V, 24V, etc.) to the connected device 104.

In some examples, the computing device 102 includes multiple USB ports. For example, the computing device 102 may include a USB hub with multiple USB ports. For ease of explanation, the computing device 102 in FIG. 1 is depicted with a single USB port 106. However, the principles for controlling USB port reboot behavior described herein may be applied to multiple USB ports.

The computing device 102 includes a controller 108 to control a power state of the USB port 106 during a reboot process of the computing device. As used herein, the "power state" refers to whether the USB port 106 is powered on or powered off. When in a powered-off state, the USB port 106 does not provide power to the connected device 104. When in a powered-on state, the USB port 106 may provide power to the connected device 104. In some examples, the controller 108 may be referred to as a power delivery controller.

In some examples, the computing device 102 may include a number of GPIO pins to connect the controller 108 to individual USB ports. Thus, a given GPIO pin may be assigned to USB port 106. The controller 108 may cause the USB port 106 to power off or power on by issuing a signal to the GPIO pin of the USB port 106. A first signal on the GPIO pin may cause the USB port 106 to power off. A second signal on the GPIO pin may cause the USB port 106 to power on.

The computing device 102 may include a BIOS 110. The BIOS 110 may perform operations to boot an operating system and initialize components of the computing device 102. For example, the BIOS 110 may initialize the controller 108. The BIOS 110 may initialize and test hardware components during a power-on self-test (POST). The BIOS 110 may also load a boot loader from a mass storage device that then initializes the operating system of the computing device 102.

The BIOS 110 may send a port reboot setting 112 to the controller 108. For example, the port reboot setting 112 may define a power-off time period that the USB port 106 is to be powered off during the reboot process. The power-off time period may be a user-configured amount of time specific to a given USB port 106. For example, the power-off time period may indicate that during the reboot process, the USB port 106 is be turned off for an amount of time indicated by the power-off time period. In some examples, the power-off time period may be set to 0 to indicate that the USB port 106 is to remain active (e.g., powered-on) during the reboot process.

In some examples, the BIOS 110 may receive the port reboot setting 112 through a BIOS boot menu or other user interface. For example, a user may access a BIOS boot menu (also referred to as an F10 menu) to set the power-off time period for the USB port 106. While in the BIOS boot menu, the user may specify a specific power-off time period for the USB port 106. In the case where the computing device 102 includes multiple USB ports, the user may set power-off time periods for different USB ports. The BIOS 110 may store the user-configured power-off time period as the port reboot setting 112. An example of a port reboot setting for multiple USB ports is described in FIG. 4.

In some examples, the BIOS 110 may receive the port reboot setting 112 through a configuration file. For example, once the port reboot setting 112 for a single USB port 106 or multiple USB ports is set, this data may be saved on the computing device 102 as a configuration file. This configuration file may be distributed to other computing devices to ensure consistent behavior.

The BIOS 110 may send the port reboot setting 112 to the controller 108 to implement the defined power-off time period for the USB port 106 during the reboot process. In some examples, the BIOS 110 may send the port reboot setting 112 to the controller 108 during a POST of the reboot process. In some examples, the BIOS 110 may send the port reboot setting 112 to the controller 108 using an I2C (or other communication protocol) command via a virtual wire signal. The port reboot setting 112 may indicate the identity of the USB port 106 and the power-off time period for the USB port 106.

Upon receiving the port reboot setting 112, the controller 108 may decode the port reboot setting 112. For example, the controller may receive the virtual wire signal from the BIOS 110. The controller 108 may determine the desired USB port 106 indicated by the port reboot setting 112. The controller 108 may also determine the power-off time period for the USB port 106.

During the reboot process, the controller 108 may cause the USB port 106 for an amount of time indicated by the power-off time period. This may include sending a signal on the GPIO pin connecting the controller 108 to the USB port 106, where the signal causes the USB port 106 (and power rail in the case of PUSB) to power off. Because the connected device 104 receives power from the USB port 106, the connected device 104 is also powered-off during the power-off time period. This may allow the connected device 104 to fully drain its voltage and clear is memory cache.

At the end of the power-off time period, the controller 108 may cause the USB port 106 to power on. For example, the controller 108 may send a signal on the GPIO pin of the USB port 106 that causes the USB port 106 to power on.

In some examples, the power-off time period may be set to 0. In this case, the controller 108 may cause the USB port 106 to remain powered on during the reboot process. For example, the controller 108 may send a signal on the GPIO pin of the USB port 106 that causes the USB port 106 to remain powered on while the computing device 102 performs a reboot.

Figure 2:
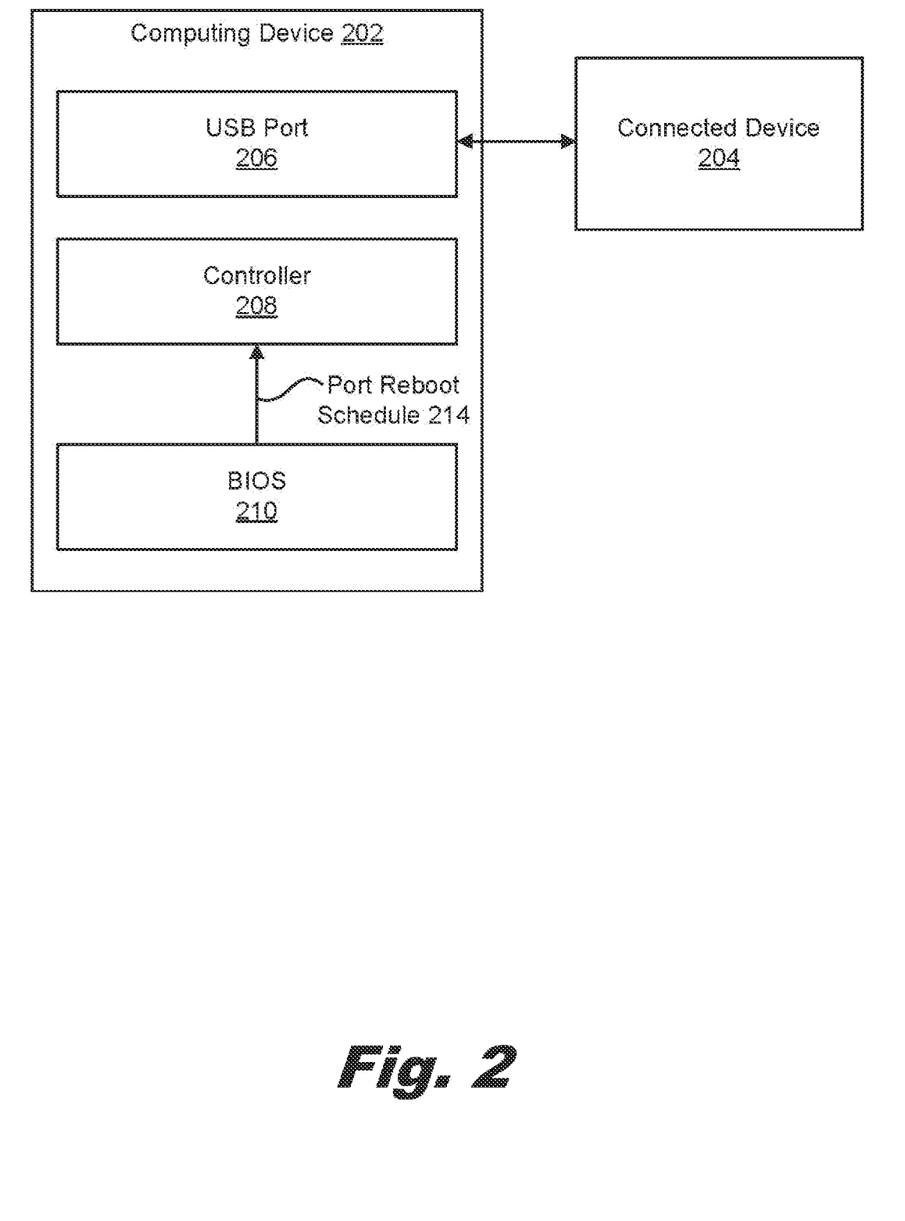
FIG. 2 is a block diagram of computing device to control port reboot behavior, according to another example.

FIG. 2 is a block diagram of computing device 202 to control USB port reboot behavior, according to another example. The computing device 202 of FIG. 2 may be implemented according to the computing device 102 of FIG. 1. For example, the computing device 202 may include a USB port 206 to provide a data connection a power to a connected device 204. The computing device 202 may also include a controller 208 to control the power state of the USB port 206.

In the implementation of FIG. 2, the BIOS 210 may send a port reboot schedule 214 to the controller 208. The port reboot schedule defines a power-off time period and a scheduled time that the USB port 206 is to be powered off while the computing device 202 remains operational. For example, the connected device 204 (e.g., a payment terminal) may take a long time to reboot. Thus, a reboot of the connected device 204 may be skipped during a reboot of the computing device 202. However, it may be useful to reboot the connected device 204 for other reasons. For instance, if the connected device 204 is a payment terminal, government rules may dictate that the connected device 204 be rebooted daily to clean out memory.

In some examples, the port reboot schedule 214 is user-configurable through a BIOS boot menu. For instance, a user may access the BIOS boot menu to specify which USB port 206 to reboot. The user may specify the power-off time period for the USB port 206 to be powered off. The user may also specify the scheduled time (e.g., time of day, week, month, year, etc.) when the USB port 206 is to be powered off. The BIOS 210 may save the port reboot schedule 214.

In some examples, the controller 208 may be a power delivery controller for the USB port 206 that implements the port reboot schedule 214. In some examples, the controller 208 may be a service or driver of the operating system (OS) that receives the port reboot schedule 214. The OS service or driver may then cause the USB port 206 to be powered off according to the port reboot schedule 214.

The controller 208 may cause the USB port 206 to power off for the power-off time period at the scheduled time. For example, while the computing device 202 is operational, the controller 208 may monitor the port reboot schedule 214 and power off the USB port 206 at the scheduled time. The controller 208 may then cause the USB port 206 to power on at the end of the power-off time period. Thus, the connected device 204 is rebooted with the scheduled power cycling of the USB port 206.

In some examples, the computing device 202 includes a plurality of USB ports. In this case, the port reboot schedule 214 may Indicate a port identifier of a given USB port 206 to the controller 208. For example, the port reboot schedule 214 may identify a specific USB port 206 that is to be rebooted. The port identifier may include a name, address. ID number, etc. for the USB port 206. Upon receiving the port reboot schedule 214, the controller may identify the given USB port 206 from among the plurality of USB ports based on the port identifier. The controller 208 may apply the port reboot schedule to the given USB port 206. In other words, the controller 208 may cause the given USB port to power off for the power-off time period at the scheduled time. The other USB ports may remain active.

Figure 3:
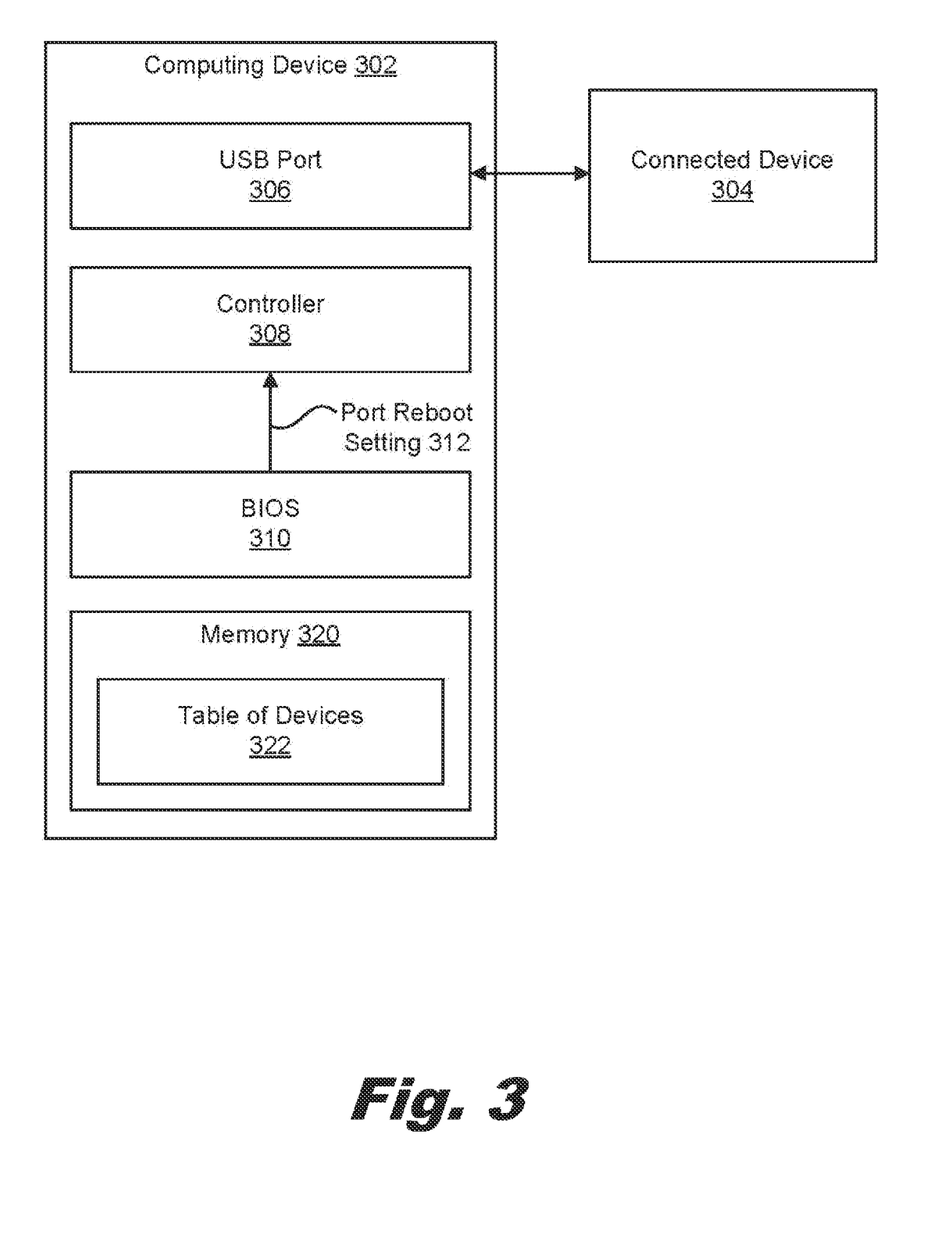
FIG. 3 is a block diagram of computing device to control port reboot behavior, according to another example.

FIG. 3 is a block diagram of computing device 302 to control USB port reboot behavior, according to another example. The computing device 302 of FIG. 3 may be implemented according to the computing device 102 of FIG. 1. For example, the computing device 302 may include a USB port 306 to provide a data connection a power to a connected device 304. The computing device 302 may also include a controller 308 to control the power state of the USB port 306.

In the implementation of FIG. 3, the BIOS 310 may set the port reboot setting 312 for the USB port 306 based on an identification of the connected device 304. In this case, the BIOS 310 performs the device identification and sets the power-off time period for the USB port 306 based on the device identification.

The computing device 302 may include memory 320 to store a table of devices 322. In some examples, the table of devices 322 includes a plurality of device identifiers for different devices. The device identifiers may indicate a specific device or a type (e.g., make, model, year, etc.) of the device. For instance, the device identifiers may indicate a number of different printers (or other hardware), any one of which may be connected to the USB port 306. In some examples, the device identifier may include a vendor ID (VID) a product ID (PID), or a combination thereof.

The device identifiers may be mapped to power-off time periods for the different devices. For example, a first device identifier for a first device (or device type) may be mapped to a first power-off time period. A second device identifier for a second device (or device type) may be mapped to a second power-off time period, and so forth.

The BIOS 310 may identify the connected device 304 based on a device identifier received from the connected device 304 and the table of devices 322. For example, when the connected device 304 is plugged into the USB port 306, the BIOS 310 may scan the connected device 304 to determine the device identifier. In some examples, the connected device 304 may send the device identifier directly to the BIOS 310 upon connecting to the USB port 306. The BIOS 310 may then identify the connected device 304 by looking up the device identifier in the table of devices 322. For instance, the BIOS 310 may determine whether the device identifier received from the connected device 304 matches any of the device identifiers included in the table of devices 322.

The BIOS 310 may determine a power-off time period that the USB port 306 is to be powered off during a reboot process based on the identified connected device 304 connected to the USB port 306. For example, upon identifying a match of the device identifier of the connected device 304 in the table of devices 322, the BIOS 310 may obtain the power-off time period that is mapped to that device in the table of devices 322.

Upon determining the power-off time period for the identified connected device 304, the BIOS 310 may store the power-off time period as a port reboot setting 312. The port reboot setting 312 identifies the USB port 306 and the power-off time period that the USB port 306 is to be powered off during the reboot process. The BIOS 310 may send the port reboot setting 312 to the controller 308. For example, the BIOS 310 may send the port reboot setting 312 to the controller 308 during a POST of a reboot process. The controller 308 may cause the USB port 306 to power off for the power-off time period during the reboot process, as described in FIG. 1.

Figure 4:
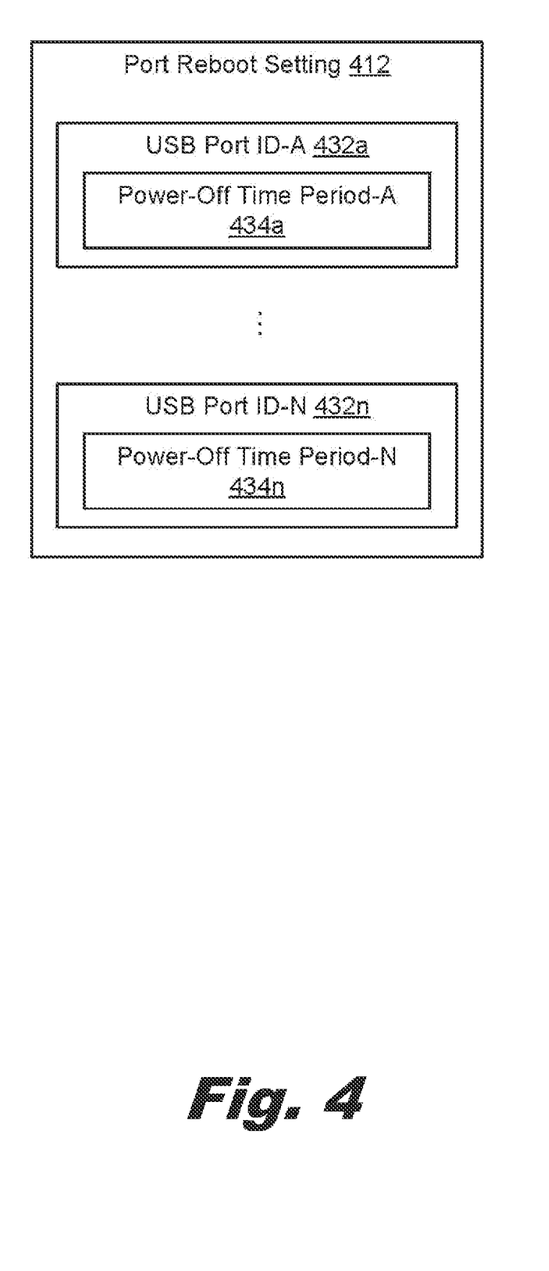
FIG. 4 is a block diagram illustrating a port reboot setting, according to an example.

FIG. 4 is a block diagram illustrating a port reboot setting 412, according to an example. In this case, a computing device may include multiple USB ports. A user may set the power-off time period for individual USB ports. For example, the user may access a BIOS boot menu or other user interface to set the power-off time periods for different USB ports.

In the example of FIG. 4, the port reboot setting 412 includes power-off time periods 434a-n for USB ports A-N. The USB ports may be identified by USB port IDs 432a-n, where each USB port has a unique USB port ID 432. A separate power-off time period 434 may be saved to a given USB port ID 432. Thus, USB port-A may have a first power-off time period, USB port-B may have a second power-off time period, and so forth. The port reboot setting 412 may be sent to the controller of the USB ports to apply the power-off time periods 434a-n during a reboot process.

In an example of the values that may be assigned in the port reboot setting 412, the power-off time period 434a for USB port-A may be set to 0. Thus, power to USB port-A may remain on during the reboot process. The power-off time period 434b for USB port-B may be set to 1 second to accommodate a display attached to USB port-B. The power-off time period 434c for USB port-C may be set to 15 seconds to accommodate a printer attached to USB port-C.

The power-off time period 434d for USB port-D may be set to 30 seconds to accommodate a pin pad attached to USB port-D. The power-off time period 434f for USB port-F may be set to the default (e.g., 0.5 seconds) for the USB chipset. As seen by this example, the reboot behavior for each USB port may be individually set to accommodate different types of devices that are connected to the different USB ports.

Figure 5:
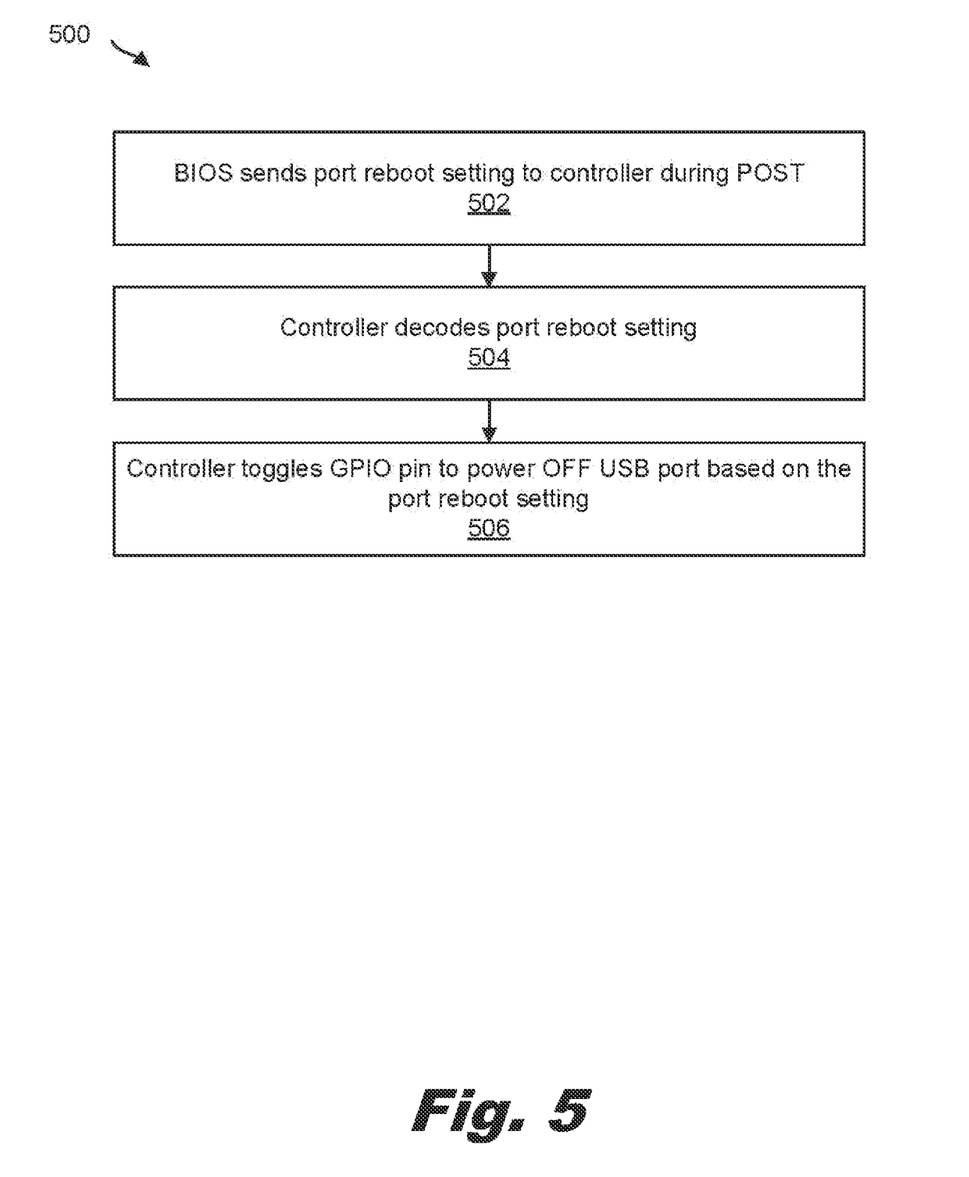
FIG. 5 is a flow diagram illustrating a method for controlling USB reboot behavior, according to an example.

FIG. 5 is a flow diagram illustrating a method 500 for controlling USB reboot behavior, according to an example. At 502, the BIOS (FIG. 1, 110) sends a port reboot setting (FIG. 1, 112) to the controller (FIG. 1, 108) of a USB port (FIG. 1, 106) during a POST of a reboot process. For example, the BIOS (FIG. 1, 110) may send an I2C command to the controller (FIG. 1, 108) via a virtual wire signal indicating the USB-port location (e.g., ID, address, etc.) and the power-off time period.

At 504, the controller (FIG. 1, 108) decodes the port reboot setting (FIG. 1, 112). For example, the controller (FIG. 1, 108) deciphers the virtual wire signal to determine the USB-port location and the power-off time period for a given USB port (FIG. 1, 106). The controller (FIG. 1, 108) may determine a GPIO pin that routes to the given USB port (FIG. 1, 106) indicated by the port reboot setting (FIG. 1, 112).

At 506, the controller (FIG. 1, 108) toggles the GPIO pin to power off the USB port (FIG. 1, 106) based on the port reboot setting (FIG. 1, 112). For example, the controller (FIG. 1, 108) may set the GPIO pin to power off the USB port (FIG. 1, 106). At the end of the power-off time period, the controller (FIG. 1, 108) may set the GPIO pin to restore power to the USB port (FIG. 1, 106).

What is claimed is:

1. A computing device, comprising:
a universal serial bus (USB) port, wherein the USB port provides power to a connected device;
a basic input/output system (BIOS); and
a controller communicatively coupled to the BIOS, wherein the controller is to:
receive a port reboot setting from the BIOS, wherein the port reboot setting includes at least a power-off time period for the USB port; and
in response to a reboot of the computing device, power off the USB port for the power-off time period defined in the port reboot setting.

2. The computing device of claim 1, wherein the BIOS is to receive the port reboot setting through a configuration file.

3. The computing device of claim 1, wherein the BIOS is to receive the port reboot setting through a BIOS boot menu.

4. The computing device of claim 1, wherein the BIOS is to store the port reboot setting.

5. The computing device of claim 1, wherein the BIOS is to send the port reboot setting to the controller during a power on self-test (POST) of a reboot process of the computing device.

6. A computing device, comprising:
a universal serial bus (USB) port, wherein the USB port provides power to a connected device;
a basic input/output system (BIOS); and
a controller communicatively coupled to the BIOS, wherein the controller is to:
receive a port reboot schedule from the BIOS, wherein the port reboot schedule defines a power-off time period and a scheduled time for the USB port to be powered off during the operation of the computing device.

7. The computing device of claim 6, wherein the controller causes the USB port to power off for the power-off time period at the scheduled time.

8. The computing device of claim 7, wherein the controller causes the USB port to power on at an end of the power-off time period.

9. The computing device of claim 6, wherein the computing device comprises a plurality of USB ports, and wherein the port reboot schedule indicates a port identifier of a given USB port to the controller.

10. The computing device of claim 9, wherein the controller is to:
identify the given USB port from among the plurality of USB ports based on the port identifier; and
apply the port reboot schedule to the given USB port.

11. The computing device of claim 6, wherein the power-off time period and the scheduled time of the port reboot schedule are user-configurable through a BIOS boot menu.

12. A computing device, comprising:
a universal serial bus (USB) port to provide a data connection and power to a connected device;
a controller to control a power state of the USB port during a reboot process of the computing device;
a memory to store a table of devices;
a basic input/output system (BIOS) to:
identify the connected device based on a device identifier received from the connected device and the table of devices; and
determine a power-off time period that the USB port is to be powered off during a reboot process based on the identified connected device connected to the USB port; and
send a port reboot setting to the controller identifying the power-off time period that the USB port is to be powered off during the reboot process.

13. The computing device of claim 12, wherein the controller is to cause the USB port to power off for the power-off time period during the reboot process.

14. The computing device of claim 12, wherein the BIOS is to identify the connected device by looking up the device identifier received from the connected device in the table of devices.

15. The computing device of claim 12, wherein the table of devices comprises a plurality of device identifiers for different devices that are mapped to power-off time periods for the different devices.

* * * * *